July 28, 1942.    J. H. ERIKSSON    2,290,868
APPARATUS FOR TESTING MATERIALS WITH REGARD TO THEIR TENSILE STRENGTH
Filed Oct. 16, 1939
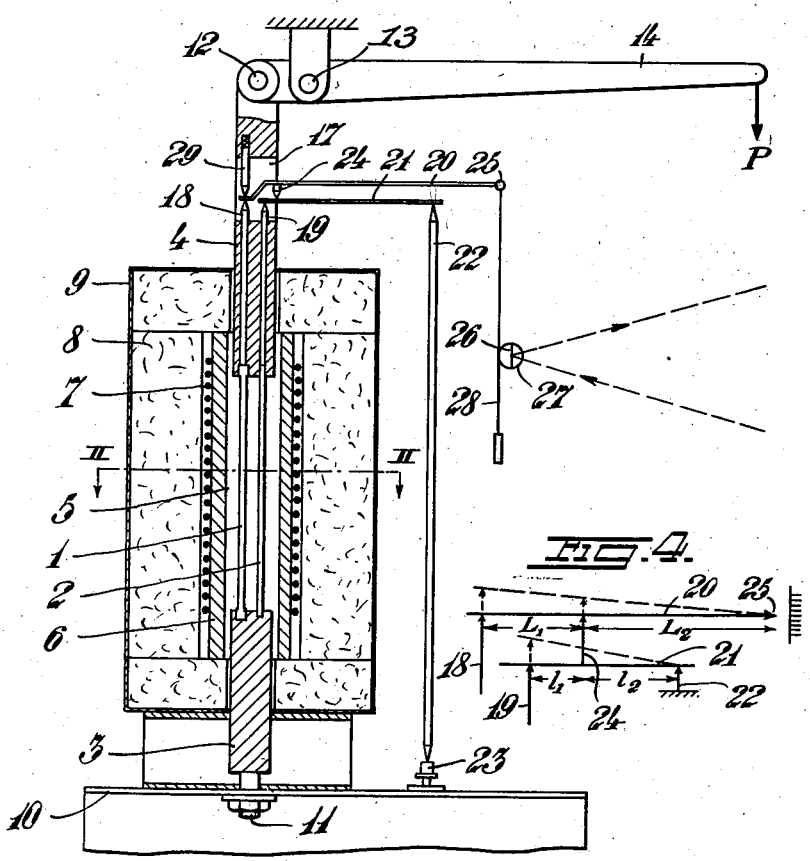
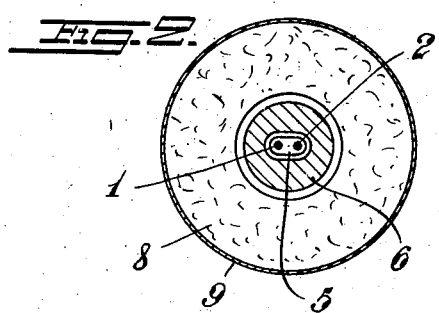
Inventor,
Johan H. Eriksson,
By Sommers & Young,
Attys.

Patented July 28, 1942

2,290,868

UNITED STATES PATENT OFFICE 2,290,868

APPARATUS FOR TESTING MATERIALS WITH REGARD TO THEIR TENSILE STRENGTH

Johan Helge Eriksson, Finspong, Sweden

Application October 16, 1939, Serial No. 299,757
In Sweden November 4, 1938

9 Claims. (Cl. 73—51)

The present invention relates to apparatus for testing materials with regard to their tensile strength.

The main object of the invention is to provide an apparatus of this type in which the influence of temperature variations upon the test is eliminated.

Other objects will be obvious from the following description of one embodiment of the invention, shown in the annexed drawing.

Fig. 1 shows a vertical section of the apparatus according to the invention.

Fig. 2 shows a horizontal section taken on the line II—II in Fig. 1.

Fig. 3 shows a portion of the section according to Fig. 1 on a greater scale.

Fig. 4 is a diagrammatical view of a lever system operating the indicator device.

According to the present invention, in addition to the usual test bar, a second bar of the material to be tested, is arranged in operative connection with the indicator device in such manner, that it compensates for temperature variations.

For obtaining this result the tensile test according to the invention is carried out in the following manner: Two equal pieces, such as bars, of the material, which is to be tested, are arranged in such manner in relation to the indicator device, that they, when such variations of the length, which are caused by temperature variations, occur, will act, oppositely to each other, upon the indicator device, which, thus, will not make any deflection, when the variations of the length of the bars are equal. Then, one of these bars, viz. the test bar, is subjected to a tensile load, and the elongation of the same in relation to the other, non-loaded bar, viz. the comparison or compensating bar, is measured.

By locating the two bars in an externally insulated chamber, in which the same temperature exists throughout, the two bars are kept at the same temperature during the test. If desired, it is possible to keep this chamber heated to any high temperature. This is important in view of the fact, that the high temperatures, which nowadays are used in the mechanical engineering and elsewhere, require that the strength of the materials be tested under the temperatures, to which they are subjected in practice. According to the invention such tests may be carried out in a reliable manner by means of a simple apparatus. However, this apparatus may be used also for normal tensile tests without heating, but when elimination of variations of the temperature of the surrounding atmosphere is desired.

In Fig. 1 of the drawing the reference numerals 1 and 2 indicate two equal or substantially equal bars of the material, the tensile strength of which is to be tested. The two bars are mounted between a lower holder 3 and an upper holder 4 within a chamber 5, which is surrounded by a heat-proof material 6, for instance a cylinder of heat-proof cast iron, having a bore throughout, which forms the chamber 5. The cast iron cylinder 6 is surrounded, for instance, by an electrical heating element 7 and is, further, outside the heating element, enclosed by an insulation 8, which is enclosed by a sheet-metal covering 9. In the drawing the elements 6—9 enumerated above constitute an externally cylindrical body, the holders 3 and 4 protruding through the opposite ends of this body. The lower holder 3 is connected with a stand 10 by means of a screw- and nut-connection 11, which allows a certain adjustment of the holder 3 in its longitudinal direction (on the drawing in the vertical direction). The upper holder 4 is guided slidably in an opening in the upper end-wall of the insulation 8 and the sheet-metal covering 9. At the upper end the holder 4 is, by means of the pin 12, connected with a lever 14, which is mounted at 13 and carries an adjustable weight-load, in the drawing indicated by the arrow P.

The bar 1, viz. the test bar, has its lower end screwed into the holder 3 and has its upper end screwed into the holder 4, as shown in Fig. 3, whereas the bar 2, viz. the compensating bar, has its lower end resting loosely in a recess in the holder 3 and has its upper end engaging a vertical bore 16 in the holder 4, as shown in Fig. 3, where, however, the clearance of the bar end is excessively designed. Above the bar 1 the holder 4 has a similar bore 15. At the top the two bores 15, 16 open into a transverse aperture 17 in the holder 4. Each bore contains a quartz bar 18 and 19 respectively, which bears upon the upper end of the corresponding bar 1, 2, and the upper end of which terminates in the aperture 17. The quartz bars serve the purpose of transmitting the variations of the length of the bars 1, 2 to an indicator device, independent of variations of the length of the holder 4. Therefore, they are lodged loosely in the bores 15, 16. The upper ends of the same preferably are provided with metallic ferrules shaped as points.

One end of a lever 20 bears upon the point of the bar 18 and one end of a lever 21 bears upon the point of the bar 19. The last-mentioned lever has the other end bearing upon a stationary prop, in the drawing shown as the point of a bar 22, which has the lower end, also shaped as a point, resting upon a bearing 23 on the stand 10 of the apparatus, which bearing preferably is adjustable in the vertical direction. The lever 20 bears, by means of an intermediate fulcrum or edge 24, upon the lever 21 and is connected, at the other end, to an indicator device. This may be of any type, but is, in the drawing, shown as an optical system having a mirror 26 fixed to a roller 27, around which a weight-loaded thread 28 attached to the end 25 of the lever 20, is wound. The dashed lines provided with arrows, indicate an incident and reflected light ray. The lever 20 is held against the point of the quartz bar 18 by means of a spring-pressed pin 29, mounted in the holder 4 above the aperture 17.

The lever system described above is of such construction, that equal variations of the length of the two bars 1 and 2 to not influence the indicator device. The principle of the construction is illustrated in Fig. 4. The reference numerals are the same as in Fig. 1. In addition, the arms of the lever 20 are indicated by $L_1$ and $L_2$ and the arms of the lever 21 are indicated by $l_1$ and $l_2$. The terminal 25 of the lever 20 points directly at a scale. If the ratio of $L_1$ to $L_2$ is as the ratio of $l_1$ to $l_2$, a parallel displacement of the operating points of the quartz bars in the vertical direction will not cause any movement of the terminal point 25 of the lever 20. Thus, such variations in the length of the two bars 1 and 2, which are caused by variations of the temperature, have no effect on the indicator device, because the two bars always have the same temperature and, thus, are subjected to the same variations of the length when the temperature changes. By means of the heating element 7 the temperature in the chamber 5 may be increased discretionally, the two bars then obtaining the same temperature. Overmore, each bar obtains the same temperature over its entire length owing to a suitably selected disposition of the coiled filaments of the heating element of the chamber as well as on account of the provision of the heat equalizing layer 6.

The lever system may be of such construction, that it causes a certain multiplication of the longitudinal difference between the test bar and the compensating bar, for instance 20 times. Then, the optical indicating system may be of such construction, that it multiplies the deflection of the lever system, for instance 50 times. Thus, the final indication constitutes a multiple of the true elongation, which multiple is obtained by the two multiplications, and which indication, in the example referred to, is 1000 times greater than the true elongation.

What I claim is:-

1. In an apparatus for testing materials with regard to their tensile strength, in combination, stationary means for securely mounting one end of a bar of the material to be tested, movable means for securely mounting the other end of said test bar, a loading device connected with said movable means for stretching said test bar, an indicator device connected to said test bar for measuring the elongations of the same, means for holding a second bar of the material to be tested, said second bar being of the same length as the test bar and being placed adjacent the same so as to be responsive to the same temperature conditions, and means for transmitting the variations of the length of said second bar, caused by changes of the temperature, to said indicator device in a manner opposite to that in which the indicator device is operated by the first-mentioned test bar.

2. In an apparatus for testing materials with regard to their tensile strength, in combination, stationary means for securely mounting one end of a bar of the material to be tested, movable means for securely mounting the other end of said test bar, a loading device connected with said movable means for stretching said test bar, an indicator device for measuring the elongation of said test bar when stretched, a lever for transmitting the elongation of said test bar, when stretched, to the indicator device, means for holding a second bar of the material to be tested, said second bar being of the same length as the test bar and being placed adjacent the same so as to be responsive to the same temperature conditions, and a lever for transmitting variations of the length of said second bar due to temperature changes to said indicator device in a manner opposite to that in which the indicator device is operated by the first-mentioned test bar.

3. In an apparatus for testing materials with regard to their tensile strength, in combination, a stationary holder and a movable holder for carrying between them two substantially equal bars of the material to be tested, each holder being adapted for securely mounting one of said bars and loosely mounting the other bar, a loading device in connection with the movable holder for stretching the bar securely mounted between the holders, an indicator device, for measuring the elongation of the securely mounted bar, means operatively connecting the securely mounted bar with said indicator device to act upon the latter in a certain direction, and means operatively connecting the loosely mounted bar with said indicator device to act upon the same in a direction opposite to that of the securely mounted bar.

4. In an apparatus for testing materials with regard to their tensile strength, in combination, a stationary holder and a movable holder for carrying between them two substantially equal bars of the material to be tested, a loading device connected with the movable holder, each holder having a screw hole for securely mounting one of the bars, to be stretched by the loading device, each holder also having a recess therein for loosely mounting the other bar, the movable holder having two bores, which bores form extensions of said screw hole and recess in this holder, a bar mounted slidably in each one of said bores in contact with the corresponding bar of the material to be tested, the movable holder also having a transverse aperture into which said slidable bars protrude, a lever one end of which is in contact with said slidable bar contacting the loosely mounted bar of the material to be tested, a stationary prop for supporting the other end of said lever, a second lever one end of which is in contact with said slidable bar contacting the securely mounted bar of the material to be tested, a fulcrum for the last-mentioned lever which fulcrum couples together said two levers at an intermediate point of such location that it divides each lever in two parts the ratio of the parts of one lever being as the ratio of the parts of the other lever, and an indicator device which is connected to that end of the last-mentioned lever which is not in contact with the corresponding slidable bar, for measuring the elongation of the securely mounted test bar when stretched by the loading device.

5. An apparatus for testing materials with regard to their tensile strength, as claimed in claim 4, wherein said slidable bars connecting the bars of the material to be tested, with the levers acting upon the indicator device, consist of a material such as quartz.

6. In an apparatus for testing materials with regard to their tensile strength, in combination, stationary means for securely mounting one end of a bar of the material to be tested, movable means for securely mounting the other end of said test bar, a loading device connected with said movable means for stretching said test bar, an indicator device connected to said test bar for measuring the elongations of the same, means for holding a second bar of the material to be tested, said second bar being of the same length as the test bar and being placed adjacent the same, means for transmitting the variations of the length of said second bar, caused by changes of the temperature, to said indicator device in a manner opposite to that in which the indicator device is operated by the first-mentioned test bar, and a heat-insulated chamber for enclosing said bars.

7. In an apparatus for testing materials with regard to their tensile strength, in combination, stationary means for securely mounting one end of a bar of the material to be tested, movable means for securely mounting the other end of said test bar, a loading device connected with said movable means for stretching said test bar, an indicator device connected to said test bar for measuring the elongations of the same, means for holding a second bar of the material to be tested, said second bar being of the same length as the test bar and being placed adjacent the same, means for transmitting the variations of the length of said second bar, caused by changes of the temperature, to said indicator device in a manner opposite to that in which the indicator device is operated by the first-mentioned test bar, a heat-insulated chamber for enclosing said bars, and a heating element in said chamber.

8. In an apparatus for testing materials with regard to their tensile strength, in combination, a chamber formed with two opposite end walls and consisting of a heat-insulating material, a lining in this chamber consisting of a heat-proof material, an electrical heating element in said chamber outside the heat-proof lining, a stand supporting said chamber, a stationary holder connected with the stand and protruding through one of the end walls of the chamber into the space of the same, a movable holder slidably mounted in the opposite end wall of the chamber and also protruding into the space of the same, each holder also having a recess therein for securely mounting between the holders a bar of the material to be tested, each holder also having a recess therein for loosely mounting between the holders a second bar of the material to be tested, said second bar being of the same length as the test bar, a loading device in connection with said movable holder for stretching only the securely mounted bar, and an indicator device operated in opposite directions by the bars when variations of the length of the two bars occur due to temperature changes.

9. In an apparatus for testing materials with regard to their tensile strength, in combination, a chamber formed with two opposite end walls and consisting of a heat-insulating material, a lining in this chamber consisting of a heat-proof material, an electrical heating element in said chamber outside the heat-proof lining, a stand supporting said chamber, a stationary holder connected with the stand and protruding through one of the end walls of the chamber into the space of the same, a movable holder slidably mounted in the opposite end wall of the chamber and also protruding into the space of the same, a loading device connected with the movable holder, each holder having a screw hole for securely mounting a bar of the material to be tested, to be stretched by the loading device, each holder also having a recess therein for loosely mounting a second bar of the material to be tested, the movable holder having two bores which bores form extensions of said screw hole and recess in this holder, a bar mounted slidably in each one of said bores in contact with the corresponding bar of the material to be tested, the movable holder also having a transverse aperture into which said slidable bars protrude, a lever one end of which is in contact with said slidable bar contacting the loosely mounted bar of the material to be tested, a stationary prop for supporting the other end of said lever, a second lever one end of which is in contact with said slidable bar contacting the securely mounted bar of the material to be tested, a fulcrum for the last-mentioned lever which fulcrum couples together said two levers at an intermediate point of such location that it divides each lever in two parts the ratio of the parts of one lever being as the ratio of the parts of the other lever, and an indicator device which is connected to that end of the last-mentioned lever which is not in contact with the corresponding slidable bar, for measuring the elongation of the securely mounted test bar when stretched by the loading device.

JOHAN HELGE ERIKSSON.